(12) United States Patent
Lim et al.

(10) Patent No.: US 12,449,856 B2
(45) Date of Patent: Oct. 21, 2025

(54) WATERPROOFING STRUCTURE OF ELECTRONIC DEVICE, AND ELECTRONIC DEVICE INCLUDING SAME

(71) Applicant: SAMSUNG ELECTRONICS CO., LTD., Gyeonggi-do (KR)

(72) Inventors: Jinho Lim, Suwon-si (KR); Gyeongtae Kim, Suwon-si (KR); Yonghwa Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 201 days.

(21) Appl. No.: 18/106,222

(22) Filed: Feb. 6, 2023

(65) Prior Publication Data
US 2024/0201746 A1   Jun. 20, 2024

Related U.S. Application Data

(63) Continuation of application No. PCT/KR2021/009570, filed on Jul. 23, 2021.

(30) Foreign Application Priority Data

Aug. 4, 2020   (KR) .................. 10-2020-0097204

(51) Int. Cl.
*G06F 1/16* (2006.01)
(52) U.S. Cl.
CPC .......... *G06F 1/1656* (2013.01); *G06F 1/1637* (2013.01); *G06F 1/1688* (2013.01)
(58) Field of Classification Search
CPC ...... G06F 1/1656; G06F 1/1688; H04M 1/18; H04R 1/44; H04R 1/025; H05K 5/06; H05K 5/02
See application file for complete search history.

(56) References Cited

U.S. PATENT DOCUMENTS 9,681,210 B1 *   6/2017   Lippert ................. G10K 11/18
11,202,385 B2   12/2021   Kim et al.
(Continued)

FOREIGN PATENT DOCUMENTS

JP         9-130286 A      5/1997
JP        2018-125810 A    8/2018
(Continued)

OTHER PUBLICATIONS

International Search Report (PCT/ISA/210) dated Nov. 16, 2021 issued by the International Searching Authority in International Application No. PCT/KR2021/009570.
(Continued)

*Primary Examiner* — Allen L Parker
*Assistant Examiner* — Peter Krim
(74) *Attorney, Agent, or Firm* — Sughrue Mion, PLLC

(57) ABSTRACT

An electronic device includes a display forming at least a portion of the front surface of the electronic device; a frame structure on which the display is disposed and which forms at least a portion of the side surface of the electronic device, the frame structure including a first opening portion exposed to the outside of the electronic device and oriented in a first direction and a recessed portion formed adjacent to the first opening portion; the audio module disposed adjacent to the recessed portion; a waterproof film disposed between the recessed portion and the audio module; a first adhesive member for attaching the waterproof film and the frame structure; a second adhesive member for attaching the audio module and the waterproof film; and a protection member disposed, facing the first opening portion, within a recessed space formed by the recessed portion.

13 Claims, 10 Drawing Sheets

(56) References Cited

U.S. PATENT DOCUMENTS

| | | | |
|---|---|---|---|
| 2013/0170109 A1 | 7/2013 | Cohen et al. | |
| 2016/0378142 A1* | 12/2016 | Cardinali | H04R 1/00 361/679.56 |
| 2017/0157573 A1* | 6/2017 | Mori | G06F 1/1656 |
| 2017/0347478 A1 | 11/2017 | Park et al. | |
| 2018/0035204 A1* | 2/2018 | Park | H04M 1/03 |
| 2018/0227655 A1* | 8/2018 | Yamaguchi | H04R 1/083 |
| 2019/0098121 A1 | 3/2019 | Jeon et al. | |
| 2019/0104818 A1 | 4/2019 | Deng | |
| 2021/0152903 A1 | 5/2021 | Mietta et al. | |

FOREIGN PATENT DOCUMENTS

| | | |
|---|---|---|
| JP | 6472182 B2 | 2/2019 |
| JP | 2019-54410 A | 4/2019 |
| KR | 10-2017-0133918 A | 12/2017 |
| KR | 10-1819388 B1 | 1/2018 |
| KR | 10-2018-0013613 A | 2/2018 |
| KR | 10-2019-0034063 A | 4/2019 |
| KR | 10-2020-0037772 A | 4/2020 |
| KR | 10-2020-0046628 A | 5/2020 |

OTHER PUBLICATIONS

Written Opinion (PCT/ISA/237) dated Nov. 16, 2021 issued by the International Searching Authority in International Application No. PCT/KR2021/009570.

Communication issued Oct. 8, 2024 by the Korean Intellectual Property Office in Korean Patent Application No. 10-2020-0097204.

Communication issued Jun. 23, 2025 by the Korean Intellectual Property Office in Korean Patent Application No. 10-2020-0097204.

* cited by examiner

WATERPROOFING STRUCTURE OF ELECTRONIC DEVICE, AND ELECTRONIC DEVICE INCLUDING SAME

CROSS-REFERENCE TO RELATED APPLICATION

This application is a continuation application of International Application No. PCT/KR2021/009570, filed on Jul. 23, 2021, which is based on and claims priority to Korean Patent Application No. 10-2020-0097204, filed on Aug. 4, 2020, in the Korean Intellectual Property Office, the disclosures of which are incorporated by reference herein in their entireties.

BACKGROUND

Various embodiments disclosed in the disclosure relate to a waterproof structure of a duct of an electronic device and an electronic device including the same.

Various electronic components may be densely disposed inside a housing of an electronic device. Accordingly, in order to protect various electronic components disposed inside the electronic device, hardness of the housing of the electronic device may increase although the housing of the electronic device has a slimmer volume.

The housing of the electronic device may include a hole or a duct to connect an inside and an outside of the electronic device according to a type of a component disposed in the electronic device. In this case, a structure for blocking moisture and/or foreign substances which are drawn in the electronic device through the hole should be provided in the housing.

The housing may include at least one waterproof member to ensure waterproofing performance, and the waterproof member may be disposed by considering efficient disposition relationship with other components in the electronic device.

As the waterproofing function of electronic devices is increasingly important, a method of forming a duct structure for connecting an inside and an outside of an electronic device and/or a method of disposing a waterproof member in a duct structure may be an issue.

In particular, a sharp material such as a pin may be inserted from the outside of a duct structure of an electronic device, and in this case, a waterproof member disposed in the duct structure may be broken. Accordingly, a separate waterproof member protection device is required to prevent breakage of the waterproof member, but a related-art housing may be difficult to assembly due to a complicated interior structure of the housing for protecting a waterproof member. In addition, as more members for waterproofing are required, waterproofing points may increase and it may be difficult to completely achieve waterproofing performance.

Accordingly, various embodiments disclosed in the disclosure provide a waterproof member protection structure for protecting a waterproof member without adding a separate complicated structure to a housing of an electronic device, and/or an electronic device including the same.

SUMMARY

The present disclosure relates to an electronic device and a waterproof structure for an electronic device.

According to an aspect of an embodiment, an electronic device includes: a display which forms at least part of a front surface of the electronic device: a frame structure which has the display disposed thereon, and forms at least part of a side surface of the electronic device, the frame structure comprising: a first opening exposed to an outside of the electronic device and oriented in a first direction: and a recessed portion formed adjacent to the first opening; an audio module disposed adjacent to the recessed portion; a waterproof film disposed between the recessed portion and the audio module: a first adhesive member configured to attach the waterproof film and the frame structure; a second adhesive member configured to attach the audio module and the waterproof film: and a protection member disposed in a recessed space formed by the recessed portion to face the first opening, wherein each of the first adhesive member and the second adhesive member comprises a second opening on an outside of a region where the protection member is disposed, wherein the second opening is disposed to be oriented in the first direction.

According to an aspect of an embodiment, a waterproof structure of a penetrating hole of an electronic device, the waterproof structure includes: a housing comprising a penetrating hole exposed to an outside of the electronic device and oriented in a first direction, and a recessed portion adjacent to the penetrating hole: a waterproof member which covers the recessed portion and forms a recessed space in the recessed portion, the waterproof member comprising a sound transmission portion: and protection member disposed in the recessed space which connects the penetrating hole and the sound transmission portion, wherein the sound transmission portion is disposed on an outside of a region of the waterproof member where the protection member is disposed, wherein the sound transmission portion is oriented in the first direction and misaligned from the penetrating hole.

According to various embodiments disclosed in the disclosure, a protection member is disposed on a region of a waterproof member disposed in an electronic device that is adjacent to a penetrating hole, so that the waterproof member may be protected from foreign substances entering through the penetrating hole even when a housing is not complicatedly formed.

According to various embodiments disclosed in the disclosure, a structure of a penetrating hole of a housing of an electronic device is simplified, so that a path through which a sound enters or is outputted from an audio module disposed inside the penetrating hole may be simplified, and the number of times a sound bends may be reduced, and sound transmission efficiency may be enhanced.

In addition, various effects that are directly or indirectly understood through the disclosure may be provided.

BRIEF DESCRIPTION OF DRAWINGS

The above and other aspects and features will be more apparent from the following description of example embodiments, taken in conjunction with the accompanying drawings, in which.

In explaining the drawings, the same or similar reference numerals may be used for the same or similar components.

DETAILED DESCRIPTION OF EMBODIMENTS

Figure 1:
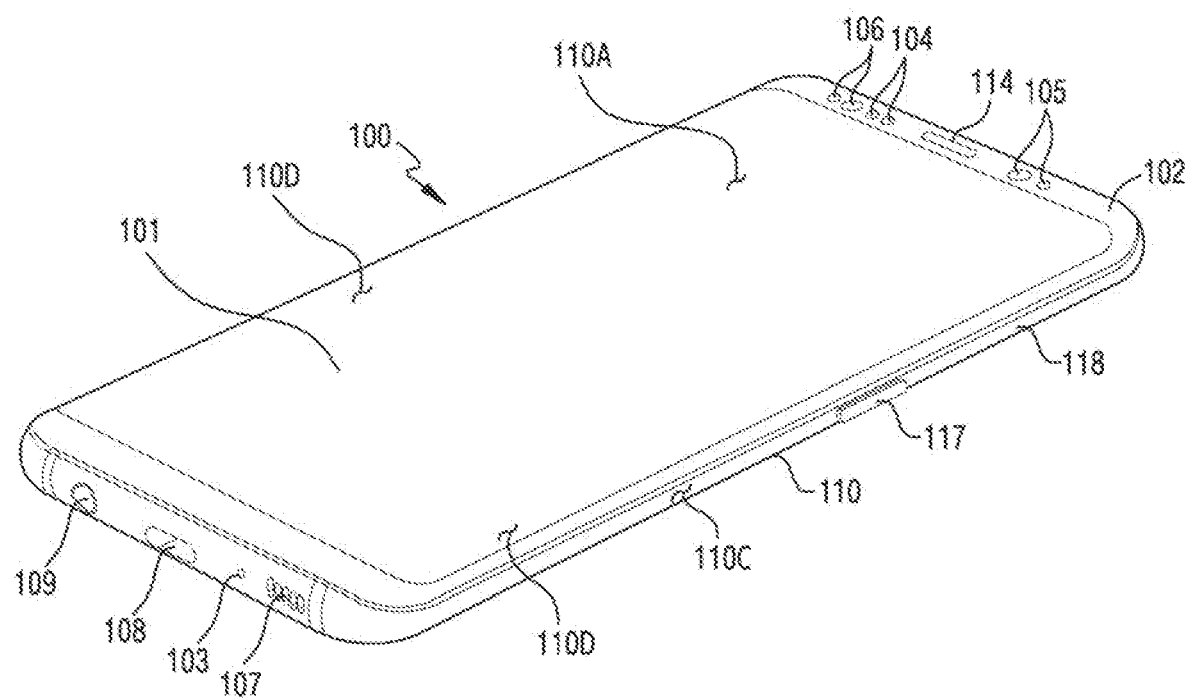
FIG. 1 is a perspective view of a front surface of a mobile electronic device according to an embodiment.

Hereinafter, various embodiments of the disclosure will be described with reference to the accompanying drawings. For convenience of explanation, sizes of components illustrated in the drawings may be exaggerated or reduced, and the disclosure are not necessarily limited by the illustrations.

An electronic device according to various embodiments of the disclosure may be one of various types of electronic devices. The electronic device may include, for example, a portable communication device (e.g., a smart phone), a computer device, a portable multimedia device, a portable medical device, a camera, a wearable device, or a home appliance. According to an embodiment of the disclosure, the electronic device is not limited to the devices described above.

It should be appreciated that various embodiments of the disclosure and the terms used therein are not intended to limit the technological features set forth herein to particular embodiments and include various changes, equivalents, or alternatives for a corresponding embodiment. Embodiments described herein are provided as examples, and thus, the present disclosure is not limited thereto, and may be realized in various other forms. With regard to the description of the drawings, similar reference numerals may be used to refer to similar or related elements. It is to be understood that a singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used in various embodiments of the disclosure may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities, and some of the multiple entities may be separately disposed in other components. According to various embodiments, one or more of the above-described components or operations may be omitted, or one or more other components or operations may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
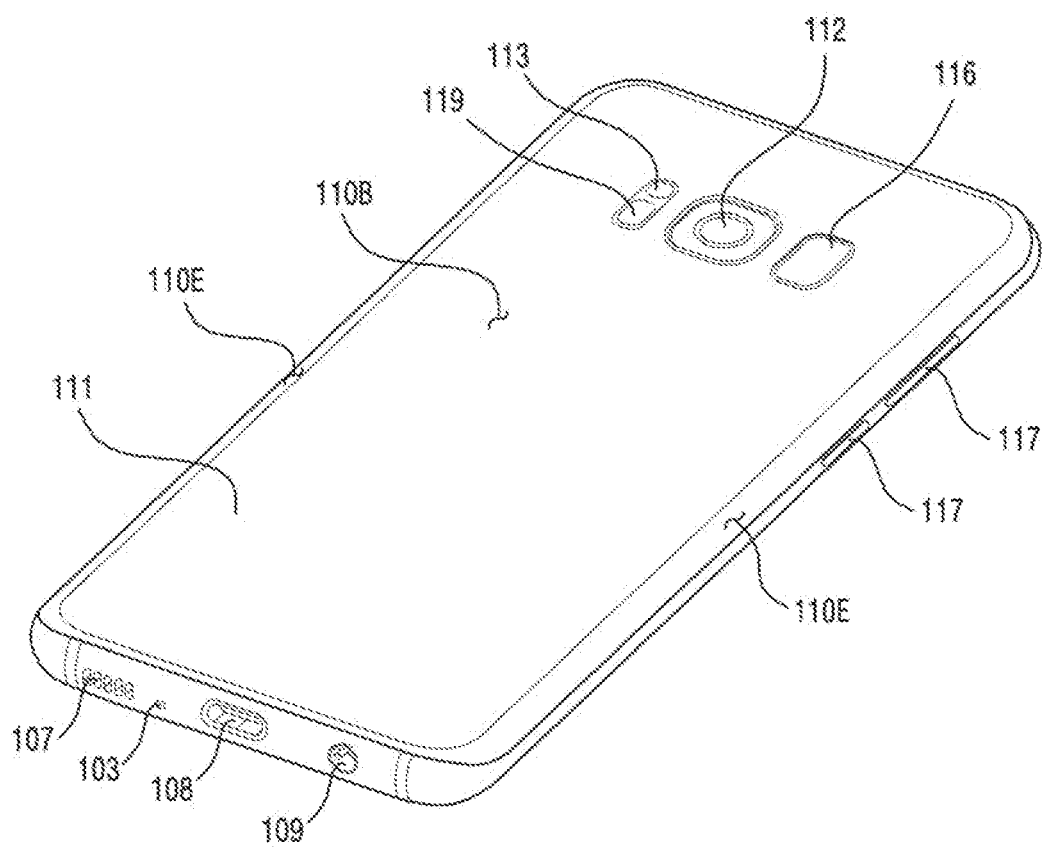
FIG. 2 is a perspective view of a rear surface of the electronic device of FIG. 1.

FIG. 1 is a perspective view of a front surface of a mobile electronic device according to an embodiment, and FIG. 2 is a perspective view of a rear surface of the electronic device of FIG. 1.

Referring to FIGS. 1 and 2, the electronic device 100 according to an embodiment may include a housing 110 which includes a first surface (or a front surface) 110A, a second surface (or a rear surface) 110B, and a side surface 110C surrounding a space between the first surface 110A and the second surface 110B. In another embodiment (not shown), the housing may refer to a structure that forms a part of the first surface 110A, the second surface 110B, and the side surface 110C of FIG. 1. According to an embodiment, the first surface 110A may be formed by the front surface plate 102 having at least part substantially transparent (for example, a glass plate including various coating layers, or a polymer plate). The second surface 110B may be formed by a rear surface plate 111 which is substantially opaque. The rear surface plate 111 may be formed by, for example, coated or colored glass, ceramic, a polymer, metal (for example, aluminum, stainless steel (STS), or magnesium), or a combination of at least two of the above-mentioned materials. The side surface 110C may be a side surface bezel structure 118 (or a "side surface member") which is coupled with the front surface plate 102 and the rear surface plate 111, and includes metal and/or a polymer. In an embodiment, the rear surface plate 111 and the side surface bezel structure 118 may be integrally formed with each other, and may include the same material (for example, a metallic material such as aluminum).

In the illustrated embodiment, the front surface plate 102 may include two first areas 110D bent from the first surface 110A toward the rear surface plate 111 and seamlessly extended, and disposed on both ends of long edges of the front surface plate 102. As shown in FIG. 2, in an embodiment, the rear surface plate 111 may include two second areas 110E bent from the second surface 110B toward the front surface plate 102 and seamlessly extended, and disposed on both ends of long edges. In an embodiment, the front surface plate 102 or the rear surface plate 111 may include only one of the first areas 110D or the second areas 110E. In another embodiment, a part of the first areas 110D or the second areas 110E may not be included. In the above-described embodiments, when viewed from a side surface of the electronic device 100, the side surface bezel structure 118 may have a first thickness (or width) on a side surface that does not include the first areas 110D or the second areas 110E and may be measured by excluding the first areas 110D or the second areas 110E described above, and may have a second thickness thinner than the first thickness on a side surface that includes the first areas 110D or the second areas 110E.

According to an embodiment, the electronic device 100 may include at least one of a display 101, audio modules, assemblies, members or components 103, 107, 114, sensor modules assemblies, members or components 104, 116, 119, camera modules assemblies, members or components 105, 112, 113, a key input device 117, a light emitting element 106, and connector holes 108, 109 and may have more or fewer of these components than shown. In an embodiment, the electronic device 100 may omit at least one of the components (for example, the key input device 117 or the light emitting element 106) or may additionally include other components.

The display 101 may be exposed through a corresponding portion of the front surface plate 102, for example. In an embodiment, at least part of the display 101 may be exposed through the front surface plate 102 forming the first surface 110A and the first area 110D of the side surface 110C. In an embodiment, a corner of the display 101 may be formed substantially the same as a shape of an outside border of the front surface plate 102 adjacent thereto, as shown in FIG. 1. In another embodiment (not shown), a gap between an outside border of the display 101 and an outside border of the front surface plate 102 may be formed substantially the same to extend an exposed area of the display 101.

In another embodiment (not shown), a recess or an opening may be formed on a part of a screen display area of the display 101, and the electronic device may include at least one of the audio module 114, the sensor module 104, the camera module 105, and the light emitting element 106 aligned with the recess or the opening. In another embodiment (not shown), the electronic device may include at least one of the audio module 114, the sensor module 104, the camera module 105, a fingerprint sensor 116, and the light emitting element 106 disposed on a rear surface of the screen display area of the display 101. In another embodiment (not shown), the display 101 may be coupled with or may be disposed adjacent to a touch sensing circuit, a pressure sensor for measuring an intensity (pressure) of a touch, and/or a digitizer for detecting a stylus pen of a magnetic field method. In a certain embodiment, at least part of the sensor modules 104, 119, and/or at least part of the key input device 117 may be disposed on the first areas 110D and/or the second areas 110E.

The audio modules 103, 107, 114 may include a microphone hole 103 and speaker holes 107, 114. The microphone hole 103 may have a microphone disposed therein to acquire an external sound, and in a certain embodiment, the microphone hole may have a plurality of microphones disposed therein to detect a direction of a sound. The speaker holes 107, 114 may include an external speaker hole 107 and a receiver hole 114 for calling. In an embodiment, the speaker holes 107, 114 and the microphone hole 103 may be implemented as one hole or a speaker may be included without the speaker holes 107, 114 (for example, a piezo speaker).

The sensor modules 104, 116, 119 may generate an electric signal or a data value corresponding to an internal operation state or an external environment state of the electronic device 100. The sensor modules 104, 116, 119 may include, for example, a first sensor module 104 (for example, a proximity sensor) and/or a second sensor module (not shown) (for example, a fingerprint sensor) disposed on the first surface 110A of the housing 110, and/or a third sensor module 119 (for example, an HRM sensor) and/or a fourth sensor module 116 (for example, a fingerprint sensor) disposed on the second surface 110B of the housing 110. The fingerprint sensor may be disposed not only on the first surface 110A of the housing 110 (for example, the display 101), but also on the second surface 110B. Any of the sensor modules 104, 116, 119 may include, or another sensor module not shown may include, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 105, 112, 113 may include a first camera device 105 disposed on the first surface 110A of the electronic device 100, a second camera device 112 disposed on the second surface 110B, and/or a flash 113. The camera devices 105, 112 may include one or a plurality of lenses, an image sensor, and/or an image signal processor. The flash 113 may include, for example, a light emitting diode or a xenon lamp. In an embodiment, two or more lenses (an infrared camera, a wide-angle lens and a telephoto lens), or image sensors may be disposed on one surface of the electronic device 100.

The key input device 117 may be disposed on the side surface 110C of the housing 110. In another embodiment, the electronic device 100 may not include a part or an entirety of the key input device 117 mentioned above, and the key input function may be implemented on the display 101 in other forms such as a soft key. In a certain embodiment, the key input device may include the sensor module 116 disposed on the second surface 110B of the housing 110.

The light emitting element 106 may be disposed on the first surface 110A of the housing 110, for example. For example, the light emitting element 106 may provide state information of the electronic device 100 in the form of light. In another embodiment, the light emitting element 106 may provide a light source interlocking with an operation of the camera module 105. The light emitting element 106 may include, for example, a light emitting diode (LED), an infrared LED (IR LED), or a xenon lamp.

The connector holes 108, 109 may include a first connector hole 108 to accommodate a connector (for example, a USB connector) for exchanging power and/or data with an external electronic device, and/or a second connector hole (for example, an earphone jack) 109 to accommodate a connector for exchanging an audio signal with an external electronic device.

Figure 3:
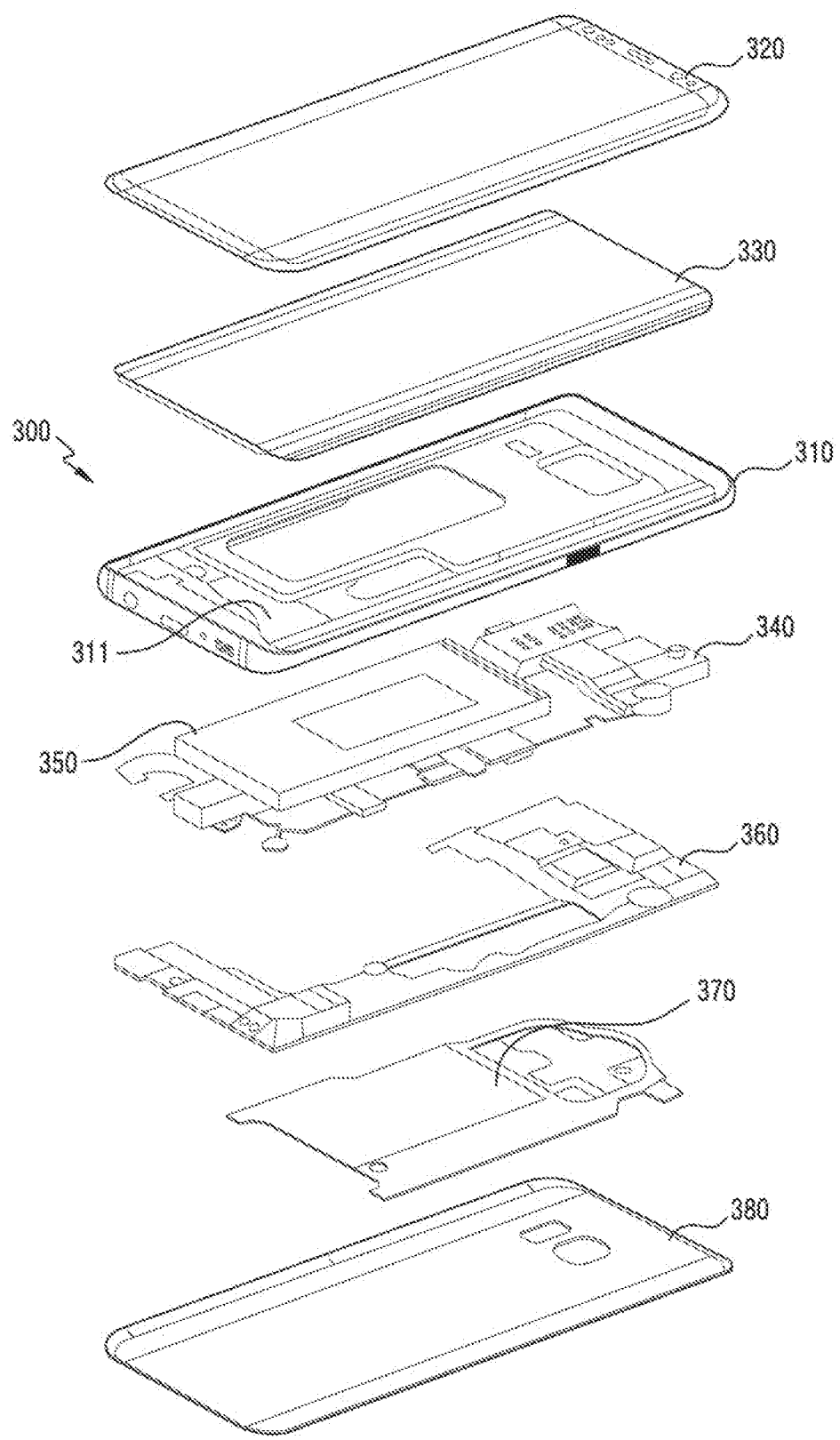
FIG. 3 is an exploded perspective view of the electronic device of FIG. 1.

FIG. 3 is an exploded perspective view of the electronic device of FIG. 1.

Referring to FIG. 3, the electronic device 300 may include a side surface bezel structure 310, a first support member 311 (for example, a bracket), a front surface plate 320, a display 330, a printed circuit board 340, a battery 350, a second support member 360 (for example a rear case), an antenna 370, and a rear surface plate 380. In an embodiment, the electronic device 300 may omit at least one (for example, the first support member 311 or the second support member 360) of the components, or may additionally include other components. At least one of the components of the electronic device 300 may be the same as or similar to at least one of the components of the electronic device 100 of FIG. 1 or 2, and a redundant explanation thereof is omitted.

The first support member 311 may be disposed inside the electronic device 300 to be connected with the side surface bezel structure 310, or may be integrally formed with the side surface bezel structure 310. For example, the first support member 311 may be formed with a metallic material and/or a nonmetallic material (for example, polymer). The first support member 311 may have one surface coupled with the display 330 and another surface coupled with the printed circuit board 340. A processor, a memory, and/or an interface may be mounted on the printed circuit board 340. The processor may include, for example, one or more of a central processing device, an application processor, a graphic processing device, an image signal processor, a sensor hub processor, or a communication processor.

The memory may include, for example, a volatile memory or a nonvolatile memory.

The interface may include, for example, a high definition multimedia interface (HDMI), a universal serial bus (USB) interface, a secure digital (SD) card interface, and/or an audio interface. The interface may electrically or physically connect the electronic device 300 with an external electronic device, and may include a USB connector, an SD card/multimedia connect card (MMC) connector, or an audio connector.

The battery 350 may be a device that supplies power to at least one component of the electronic device 300, and may include, for example, a primary battery which is not rechargeable or a secondary battery which is rechargeable, or a fuel cell. In other embodiments, the primary battery and the secondary battery are both rechargeable. At least part of the battery 350 may be disposed substantially on the same plane as the printed circuit board 340, for example. The battery 350 may be integrally disposed inside the electronic device 300, or may be attachably and detachably disposed in the electronic device 300.

The antenna 370 may be disposed between the rear surface plate 380 and the battery 350. The antenna 370 may include, for example, a near field communication (NFC) antenna, a wireless charging antenna, and/or a magnetic secure transmission (MST) antenna. The antenna 370 may perform short-range communication with an external device, or may wirelessly transmit and receive power necessary for charging. In another embodiment, an antenna structure may be formed by a part of the side surface bezel structure 310 and/or the first support member 311, or a combination thereof.

Figure 4:
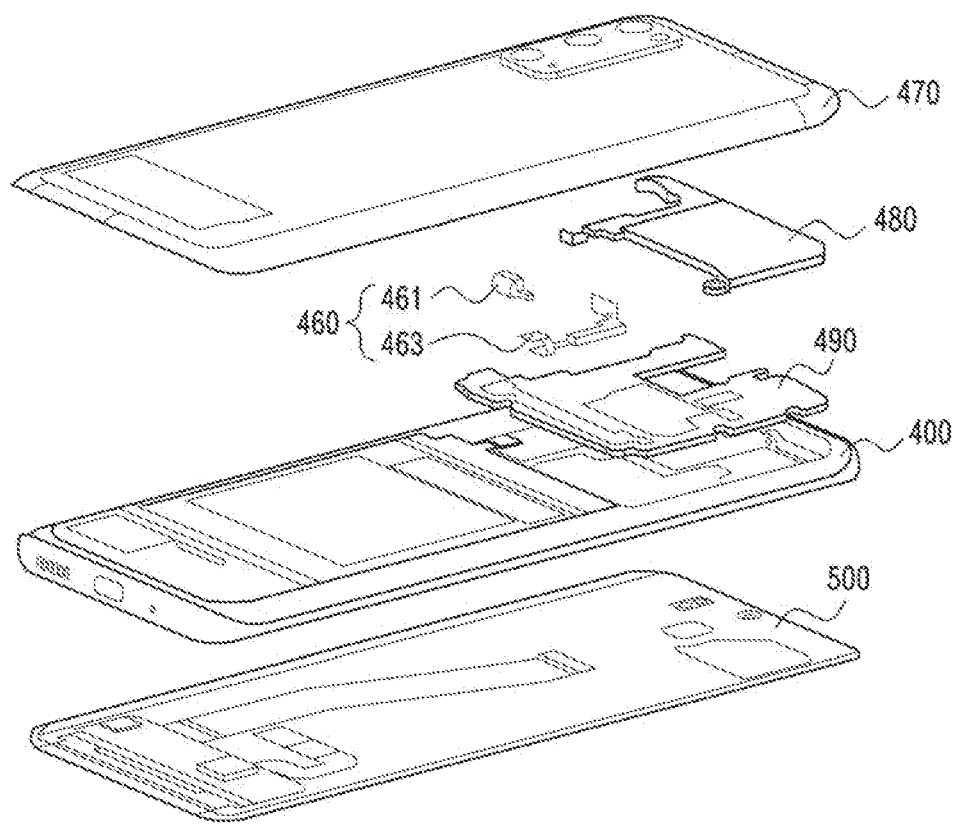
FIG. 4 is an exploded perspective view primarily illustrating a portion forming an audio module in an electronic device according to an embodiment.

FIG. 4 is an exploded perspective view primarily illustrating a portion forming an audio module or assembly 460 in an electronic device 300 according to an embodiment.

Referring to FIG. 4, the electronic device 300 according to an embodiment may further include a display 500 (for example, the display 330 of FIG. 3) that forms at least part of a front surface of the electronic device 300, and a rear surface cover 470 (for example, the rear surface plate 380 of FIG. 3) that forms at least part of a rear surface of the electronic device 300. According to an embodiment, the display 500 may be disposed in a recess formed on a frame structure 400, and the rear surface cover 470 may be coupled to a surface of the frame structure 400 that is opposite to the surface on which the display 500 is disposed.

According to an embodiment, a rear case 480 (for example, the second support member 360 of FIG. 3), the audio module 460, and a printed circuit board (PCB) 490 (for example, the printed circuit board 340 of FIG. 3) may be disposed between the frame structure 400 and the rear surface cover 470, and the audio module 460 may include a bracket 461 and a circuit board such as a flexible printed circuit board (FPCB) 463. According to an embodiment, at least one of a processor, a memory, and an interface may be mounted on the printed circuit board 490. A redundant explanation of the same components as those described in FIG. 3 will be omitted.

Figure 5:
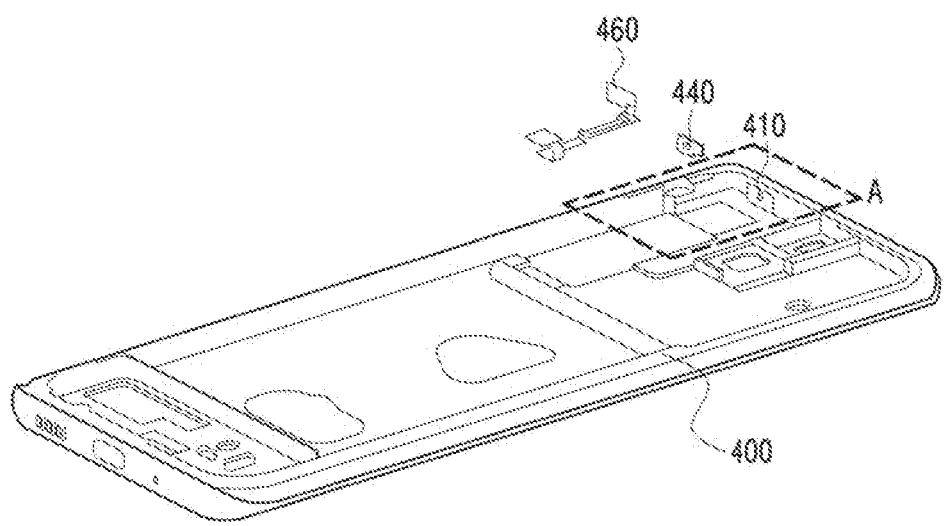
FIG. 5 is an exploded perspective view primarily illustrating a penetrating hole and the audio module in a frame structure of the electronic device according to an embodiment.

FIG. 5 is an exploded perspective view primarily illustrating a penetrating hole 410 (the penetrating hole 410 may include one or more of, for example, the microphone hole 103, the external speaker hole 107, or the receiver hole 114 of FIG. 1) and the audio module 460 in the frame structure 400 (for example, one or more of the housing 110 of FIG. 1, the side surface 110C of FIG. 1, or the side surface bezel structure 310 of FIG. 3) of the electronic device 300 according to an embodiment.

Referring to FIG. 5, the frame structure 400 (or housing) of the electronic device 300 may form at least part of an exterior of the electronic device 300. According to an embodiment, an outer surface of the frame structure 400 may form at least part of the exterior of the electronic device 300, and regions for mounting various components disposed in the electronic device 300 may be formed in the frame structure 400. According to an embodiment, the regions of the frame structure 400 on which the components are mounted may be formed to correspond to sizes and shapes of the components. According to an embodiment, the frame structure 400 may form at least part of a side surface of the electronic device 300, and may further form a front surface of the electronic device 300 extended from the side surface or a rear surface of the electronic device 300 extended from the side surface.

According to an embodiment, the electronic device 300 may include the audio module 460 to emit a sound to the outside or to acquire a sound from the outside. According to an embodiment, the audio module 460 may be disposed in a mounting region included in the frame structure 400 to accommodate the audio module 460. The audio module 460 may include, for example, a microphone to acquire an external sound or a speaker to output a sound to the outside, and may be a receiver for a communication function or a sensor using other sounds. However, the audio module 460 is not limited thereto, and may include various types of modules disposed in the electronic device 300 and requiring openings for connecting the inside and the outside of the electronic device 300. According to an embodiment, not only the audio module 460 but also various sensors (for example, a temperature sensor, an atmospheric pressure sensor, a gas sensor) may be disposed in the frame structure 400 of the electronic device 300, and may be protected by the frame structure 400 structure according to an embodiment.

According to an embodiment, the frame structure 400 of the electronic device 300 may have the penetrating hole 410 formed adjacent to the mounting region for accommodating the audio module 460 to connect the outside and the inside of the electronic device 300. A sound may be transmitted from the inside to the outside of the electronic device 300 or from the outside to the inside through the penetrating hole 410 formed in the frame structure 400. According to an embodiment, the penetrating hole 410 of the frame structure 400 may be formed on a side surface of the electronic device 300 and be exposed to the outside of the electronic device 300. According to another embodiment, the penetrating hole 410 of the frame structure 400 may be formed on a front surface of the electronic device 300, or a rear surface of the electronic device 300 that is opposite to the front surface to be exposed to the outside of the electronic device 300. In embodiments, the penetrating hole 410 may be formed on multiple surfaces.

In the disclosure, it is illustrated that the penetrating hole 410 of the frame structure 400 is exposed from a side surface of the electronic device 300 in a −y direction for convenience of explanation, but this should not be considered as limiting. The penetrating hole 410 may be disposed on any single or combination or all surfaces (that is, six surfaces in the example embodiment) of the electronic device 300 to be exposed to the outside.

According to an embodiment, a waterproof member 440 may be disposed between the penetrating hole 410 formed in the frame structure 400, and the audio module 460. The audio module 460 may be vulnerable to water or humidity, and, when the audio module 460 comes into contact with water, there may be a problem in a function of the audio module 460. According to an embodiment, the waterproof member 440 disposed between the penetrating hole 410 and the audio module 460 may prevent water from entering the inside of the electronic device 300 through the penetrating hole 410, and may protect the audio module 460 from humidity. For example, the waterproof member 400 may be manufactured by using a material that is able to block permeation of water, that is, a water impermeable material.

According to an embodiment, the waterproof member 440 may be formed not to allow liquids or solids to pass therethrough but to allow a gas to pass therethrough. According to an embodiment, the waterproof member 440 may enable a sound to be outputted from the audio module 460 through the penetrating hole 410 while preventing water from entering the audio module 460 through the penetrating hole 410 of the frame structure 400. For example, the waterproof member 440 may be formed by using a waterproof materials such as gore-tex and/or microtex.

Figure 6A:
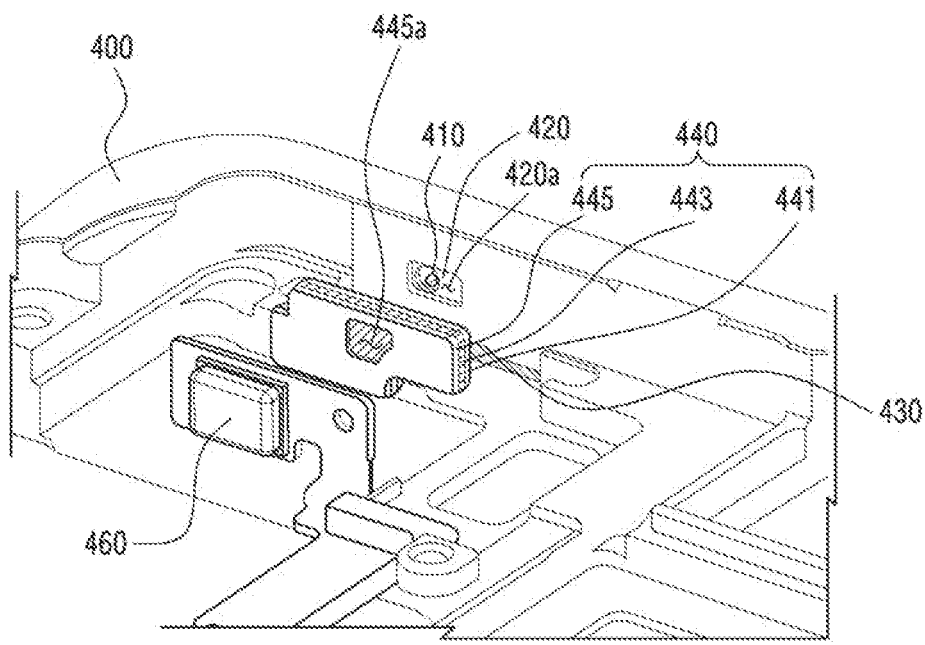
FIG. 6A is an exploded perspective view of a penetrating hole portion in which the audio module is disposed in the frame structure of the electronic device according to an embodiment.
Figure 6B:
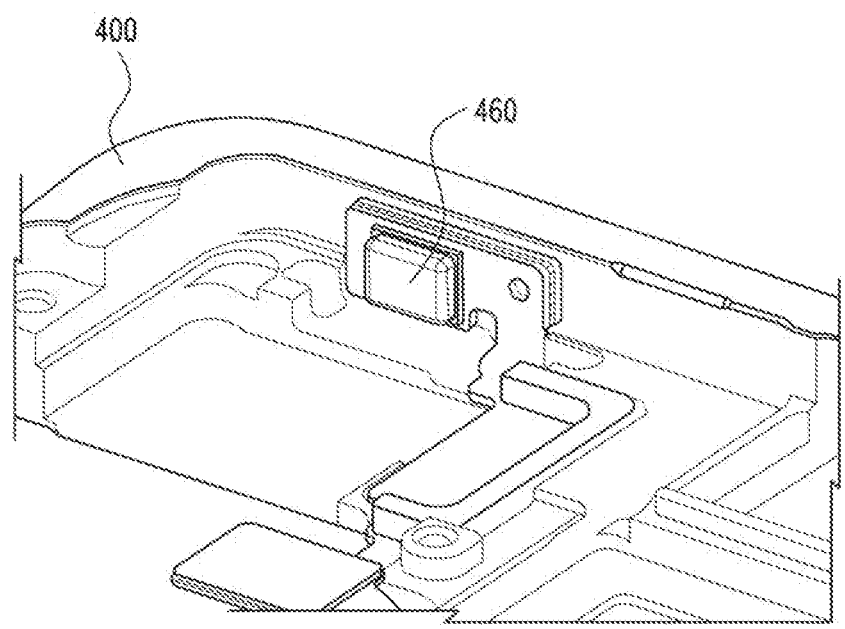
FIG. 6B is an expanded arrangement view of the penetrating hole portion in which the audio module is disposed in the frame structure of the electronic device according to an embodiment.

FIG. 6A is an exploded perspective view of a portion of the penetrating hole 410 on which the audio module 460 is disposed in the frame structure 400 of the electronic device 300 according to an embodiment, and FIG. 6B is an enlarged arrangement view of the portion of the penetrating hole 410 on which the audio module 460 is disposed in the frame structure 400 of the electronic device 300 according to an embodiment. FIGS. 6A and 6B are enlarged views of the A area of FIG. 5.

Referring to FIG. 6A, the frame structure 400 according to an embodiment may include the penetrating hole 410 serving as an opening of a path through which a sound is transmitted between the inside and the outside of the electronic device 300. A recessed portion 420 may be formed adjacent to the penetrating hole 410, and a mounting portion 430 may be formed adjacent to the recessed portion 420 to allow the audio module 460 to be disposed thereon. According to an embodiment, the mounting portion 430 may be formed to correspond to a size and a shape of the audio module 460 in order to accommodate the audio module 460. Accordingly, the audio module 460 may be accommodated on the mounting portion 430 and may be fixed without being shaken.

According to an embodiment, the audio module 460 may be disposed adjacent to the recessed portion 420 of the frame structure 400, and the waterproof member 440 may be disposed between the recessed portion 420 and the audio module 460. According to an embodiment, the waterproof member 440 may be disposed in close contact with an inside surface of the frame structure 400. The waterproof member 440 may prevent water from reaching the audio module 460 even when water enters from the outside of the electronic device 300 through the penetrating hole 410 and a recessed space 420a, and may protect the audio module 460 from liquids.

According to an embodiment, the recessed space 420a which is an empty space may be formed in the frame structure 400 due to the recessed portion 420 disposed adjacent to the penetrating hole 410 of the frame structure 400. According to an embodiment, when the audio module 460 is disposed on the mounting portion 430, the waterproof member 440 disposed between the audio module 460 and the recessed portion 420 may be disposed in close contact with the inside surface of the frame structure 400, and may cover the inside surface of the frame structure 400 from an outside of the recessed portion 420. That is, the waterproof member 440 (or the waterproof member 440 and the audio module 460) may cover the recessed portion 420 to form the recessed space 420a in the frame structure 400. According to an embodiment, the recessed space 420a formed as described above may allow a sound to pass therethrough between the audio module 460 and the penetrating hole 410.

According to an embodiment, as shown in FIG. 6A, the waterproof member 440 may include a first adhesive member 441, a waterproof film 443, and a second adhesive member 445. According to an embodiment, the first adhesive member 441 may attach the waterproof film 443 and the mounting portion 430 to one another. That is, the first adhesive member 441 may attach the waterproof film 443 to the inside surface of the frame structure 400, such that the waterproof film 443 may be disposed on the mounting portion 430 and may cover the recessed portion 420 while forming the recessed space 420a. According to an embodiment, the second adhesive member 445 may attach the audio module 460 and the waterproof film 443 to one another. That is, the second adhesive member 445 may attach the audio module 460 to the waterproof film 443, such that the audio module 460 may be disposed on the mounting portion 430.

According to an embodiment, the waterproofing function of the waterproof member 440 for protecting the audio module 460 from liquids may be attributable to the waterproof film 443 included in the waterproof member 440. According to another embodiment, the first adhesive member 441 and the second adhesive member 445 may be waterproof tapes. That is, the first adhesive member 441 and/or the second adhesive member 445 may be formed by using a material having waterproofing performance, and in this case, the first adhesive member 441 and/or the second adhesive member 445 may also have waterproofing performance. In an embodiment, the first adhesive member 441, the second adhesive member 445 and the waterproof film 443 may all contribute to the waterproofing performance.

According to an embodiment, the first adhesive member 441, the waterproof film 443, and the second adhesive member 445 forming the waterproof member 440 may be formed to have exteriors of the same size. According to an embodiment, the area of the waterproof member 440 may be smaller than the area of the audio module 460 (that is, the area of the audio module 460 that is attached to the frame structure 400 with the waterproof member 440 being disposed between the audio module 460 and the frame structure 400. Accordingly, when the audio module 460 is disposed on the mounting portion 430, the waterproof member 440 disposed between the frame structure 400 and the audio module 460 may not be exposed as shown in FIG. 6B. However, this should not be considered as limiting, and the area of the waterproof member 440 in embodiments may be larger than the area of the audio module 460 (that is, the area of the audio module 460 that is attached to the frame structure 400 with the waterproof member 440 being disposed between the audio module 460 and the frame structure 400).

According to an embodiment, the first adhesive member 441 may include a first opening (for example, see a first opening 441a of FIG. 8) formed therein, and the second adhesive member 445 may include a second opening 445a formed therein. According to an embodiment, the first opening and the second opening 445 may expose the waterproof film 443 disposed between the first adhesive member 441 and the second adhesive member 445, and a sound transmission portion (see a sound transmission portion 447 of FIG. 7) may be formed due to the exposed portion of the waterproof film 443.

According to an embodiment, the sound transmission portion may be disposed to be oriented in the same direction as a direction in which the penetrating hole 410 is oriented in the frame structure 400. Liquids or solids may be blocked by the waterproof film 443 and may not permeate the waterproof film 443, but a sound may pass through the waterproof film 443. Accordingly, a sound may enter the audio module 460 or may be outputted from the audio module 460 through the penetrating hole 410, the recessed space 420a, and the sound transmission portion disposed in the waterproof member 440.

Figure 7:
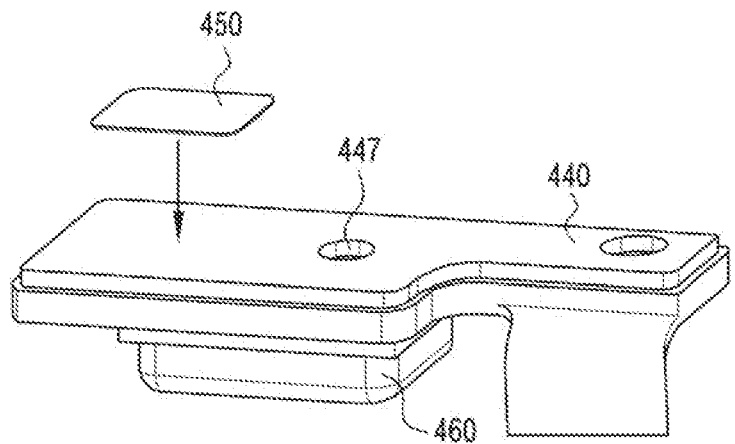
FIG. 7 is a perspective view illustrating the audio module, a waterproof member, and a protection member attached to the waterproof member according to an embodiment.
Figure 7:
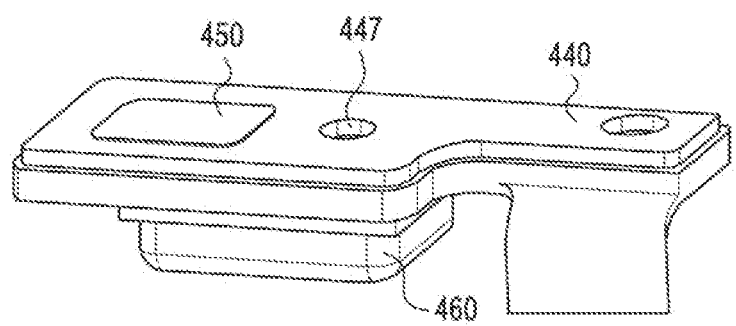

FIG. 7 is a perspective view illustrating the audio module 460, the waterproof member 440, and a protection member 450 attached to the waterproof member 440 according to an embodiment. View (A) of FIG. 7 illustrates a state before the protection member 450 is attached to the waterproof member 440, and view (B) illustrates a state in which the protection member 450 is attached to the waterproof member 440.

Referring to FIG. 7, according to an embodiment, the protection member 450 for protecting the waterproof member 440 may be attached to the waterproof member 440. That is, the protection member 450 may be attached to at least part of a surface of the waterproof member 440 that is opposite to a surface to which the audio module 460 is attached. However, the attachment position of the protection member 450 to the waterproof member 440 is not limited thereto. According to an embodiment, the protection member 450 may be disposed to be aligned with the penetrating hole 410 according to a position of the penetrating hole 410 of the frame structure 400. According to an embodiment, the protection member 450 may be disposed on a region of the first adhesive member 441 that corresponds to the recessed space 420a with the audio module 460 and the waterproof member 440 being disposed on the mounting portion 430. Accordingly, the protection member 450 may be disposed within the recessed space 420a.

According to an embodiment, the protection member 450 may protect the waterproof member 440. The protection member 450 may prevent the waterproof member 440 from being broken by a sharp foreign substance entering from the penetrating hole 410, and may protect the waterproof member 440 from the foreign substance. According to an embodiment, the protection member 450 may use a material having higher strength (or hardness) than the waterproof member 440 and the protection member 450 may be harder than the waterproof member 440. For example, the protection member 450 may be formed by using at least one material of steel use stainless (SUS), a polycarbonate (PC) sheet, and urethane, but this should not be considered as limiting.

According to an embodiment, the area of the protection member 450 may be smaller than the area of the waterproof member 440 (or the first adhesive member 441). Referring to view (B) of FIG. 7, the protection member 450 may be attached to an outside of the sound transmission portion 447 so as not to block the sound transmission portion 447 (or the first opening 441a of the first adhesive member 441) of the waterproof member 440. Accordingly, the protection member 450 may not hinder a sound from being transmitted through the sound transmission portion 447 in the waterproof member 440 while protecting the waterproof member 440.

Figure 8:
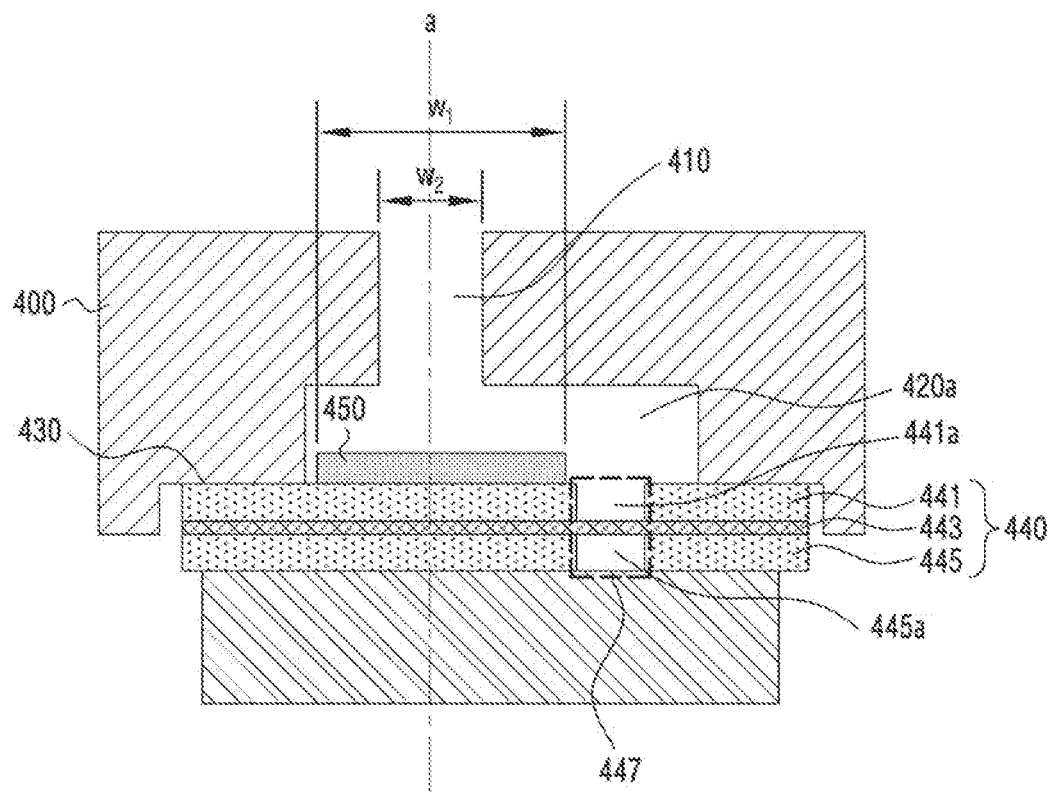
FIG. 8 is a diagram illustrating a cross section of the penetrating hole portion in which the audio module is disposed in the frame structure of the electronic device according to an embodiment.

FIG. 8 is a schematic diagram illustrating a cross section of a portion of the penetrating hole 410 on which the audio module 460 is disposed in the frame structure 400 of the electronic device 300 according to an embodiment.

Referring to the diagram of FIG. 8, a breakage prevention structure of the waterproof film 443 of a duct of the electronic device 300 will be described hereinbelow.

Referring to FIG. 8, the penetrating hole 410 formed in an a-axis direction may be disposed in the frame structure 400 forming at least part of a side surface of the electronic device 300, and the mounting portion 430 for accommodating the audio module 460 may be disposed adjacent to the penetrating hole 410. According to an embodiment, the waterproof member 440 may be disposed between the audio module 460 and the frame structure 400 with the audio module 460 being disposed on the mounting portion 430. The waterproof member 440 may include the first adhesive member 441, the waterproof film 443, and the second adhesive member 445. According to an embodiment, the audio module 460 and the waterproof member 440 may be disposed perpendicularly to the a-axis. That is, the audio module 460 and the waterproof member 440 may be disposed in parallel with the side surface of the frame structure 400 that the audio module 460 and the waterproof member 440 are adjacent to.

According to an embodiment, the first adhesive member 441 may include the first opening 441a to allow a sound to be transmitted therethrough, and the second adhesive member 445 may include a second opening 445a to allow a sound to be transmitted therethrough. A position of the first opening 441 in the first adhesive member 441, and a position of the second opening 445a in the second adhesive member 445 may be the same, and shapes of the first adhesive member 441 and the second adhesive member 445 may be the same. The first adhesive member 441 and the second adhesive member 445 may have the same shape, and the sound transmission portion 447 may be formed in the waterproof member 440 with the first adhesive member 441 and the second adhesive member 445 being attached to both side surfaces of the waterproof film 443. According to an embodiment, the penetrating hole 410 disposed in the frame structure 400 and the sound transmission portion 447 disposed in the waterproof member 440 may not be aligned with along same axis and may be disposed to be misaligned from each other along different axes, as shown in FIGS. 8 and 9.

According to an embodiment, the recessed portion 420 may be formed on the frame structure 400 adjacent to the penetrating hole 410. The waterproof member 440 and the audio module 460 may be disposed to cover the recessed portion 420 while making an empty space in the recessed portion 420. According to an embodiment, the empty space formed between the recessed portion 420 and the waterproof member 440 may be referred to as the recessed space 420a. According to an embodiment, the penetrating hole 410, the recessed space 420a, and the sound transmission portion 447 may form a duct of the electronic device 300, and a sound may enter or may be outputted through the duct formed by the penetrating hole 410, the recessed space 420a, and the sound transmission portion 447. According to an embodiment, the recessed space 420a may serve as a space to connect the penetrating hole 410 and the sound transmission portion 447 which are disposed to be misaligned from each other, and a sound may enter or may be outputted through the space formed by the penetrating hole 410, the recessed space 420a, and the sound transmission portion 447.

The waterproof film 443 disposed adjacent to the penetrating hole 410 of the frame structure 400 may be easily broken by a foreign substance entering from the outside through the penetrating hole 410. Accordingly, the protection member 450 may be attached to the first adhesive member 441 to protect a region of the waterproof member 440 corresponding to the penetrating hole 410. According to an embodiment, the protection member 450 may be positioned within the recessed space 420a, and may be disposed perpendicularly to the a-axis like the audio module 460 and the waterproof member 440. According to an embodiment, the protection member 450 may be formed such that a width $w_1$ of the protection member 450 may be longer than a width $w_2$ of the cross section of the penetrating hole 410, and an area of the protection member 450 is larger than an area of the cross section of the penetrating hole 410. That is, the first protection member 450 may cover the first adhesive member 441 to exceed a region of the first adhesive member 441 corresponding to the penetrating hole 410. Accordingly, the frame structure 400 of the electronic device 300 may protect the waterproof member 440 from the risk of entrance of an external foreign substance with a simple structure.

Figure 9:
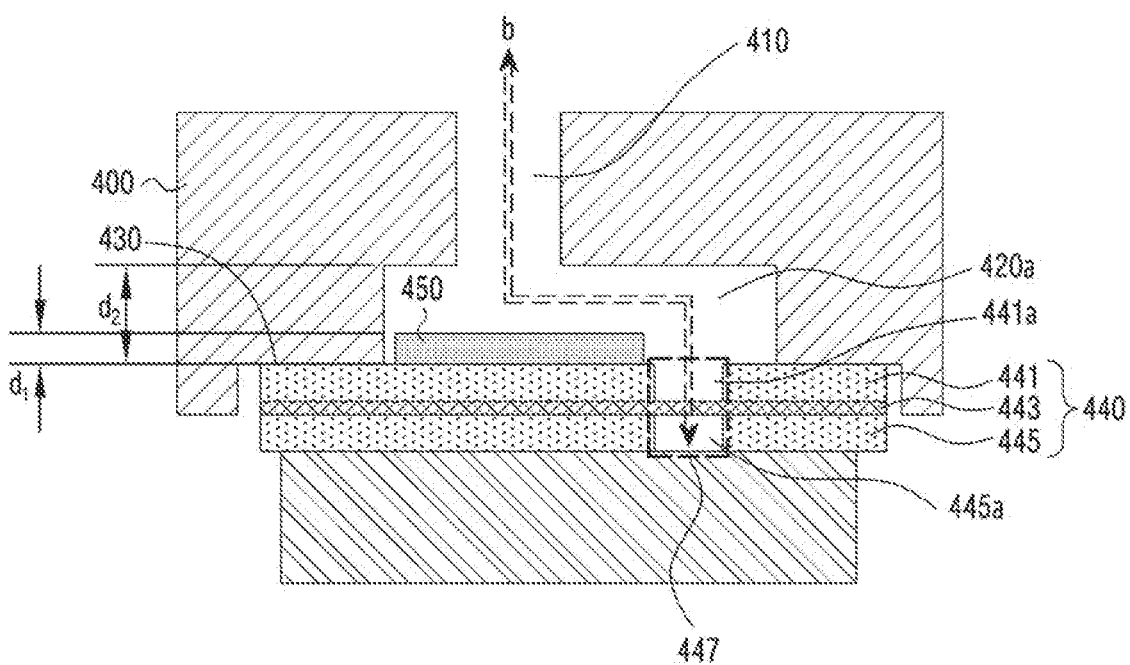
FIG. 9 is a diagram illustrating a sound inputted to or outputted from the audio module through the penetrating hole of the frame structure of the electronic device according to an embodiment.

FIG. 9 is a schematic diagram illustrating a sound entering or being outputted from the audio module 460 through the penetrating hole 410 of the frame structure 400 of the electronic device 300 according to an embodiment.

As described above in FIG. 8, a sound may enter the audio module 460 from the outside through the penetrating hole 410, the recessed space 420a, and the sound transmission portion 447, and may be outputted from the audio module 460 through the sound transmission portion 447, the recessed space 420a, and the penetrating hole 410. According to an embodiment, the protection member 450 may be positioned in the recessed space 420a formed by the recessed portion 420 and the waterproof member 440, and a thickness $d_1$ of the protection member 450 may be shorter than a thickness $d_2$ of the recessed portion 420. Accordingly, even when the protection member 450 is disposed in the recessed space 420a, an empty space (or a gap) may be formed in the recessed space 420a to allow a sound to pass therethrough.

According to an embodiment, a structure connecting the penetrating hole 410, the recessed space 420a, and the sound transmission portion 447 may be referred to as a duct structure of the electronic device 300, which is indicated by the arrow b in FIG. 9. According to an embodiment, a direction in which the penetrating hole 410 is oriented and a direction in which the sound transmission portion 447 is oriented may be the same, and accordingly, a sound may enter the audio module 460 in the same direction as a direction in which the sound enters the penetrating hole 410. Referring to the arrow b of FIG. 9, a path through which a sound enters the inside of the electronic device 300 from the outside of the electronic device 300 or is outputted may be bent by 90 degrees (or an angle close to 90 degrees) two times. That is, the sound may pass through the electronic device 300 without passing through a complicated sound transmission path. The electronic device 300 may reduce the number of times a sound bends in the sound transmission path, and may reduce a degree of loss caused by a sound colliding with an obstacle by using the above-described structure.

Referring to FIG. 9, the frame structure 400 of the electronic device 300 may guarantee waterproofing effect of the structure of the penetrating hole 410 and protecting effect of the waterproof film 443 although it is not completely designed. Accordingly, a process of manufacturing the frame structure 400 may be simplified, and a manufacturing cost of the frame structure 400 may be saved. In addition, types and number of components (or members) used for the waterproofing function or the protecting function of the waterproof member 440 may be reduced, so that a possibility of water leak occurring in a coupling portion between components may be reduced, and high waterproofing efficiency may be guaranteed.

As described above, an electronic device (for example, the electronic device 100 of FIG. 1, the electronic device 300 of FIG. 3) according to an embodiment may include: a display which forms at least part of a front surface of the electronic device: a frame structure which has the display disposed thereon, and forms at least part of a side surface of the electronic device, the frame structure including: a first opening exposed to an outside of the electronic device and oriented in a first direction; and a recessed portion formed adjacent to the first opening: an audio module disposed adjacent to the recessed portion: a waterproof film disposed between the recessed portion and the audio module; a first adhesive member configured to attach the waterproof film and the frame structure; a second adhesive member configured to attach the audio module and the waterproof film: and a protection member disposed in a recessed space formed by the recessed portion to face the first opening, and each of the first adhesive member and the second adhesive member may include a second opening formed on an outside of a region where the protection member is disposed, and the second opening may be disposed to be oriented in the first direction.

According to an embodiment, the audio module may be disposed to output a sound in the first direction or to receive a sound in the first direction.

According to an embodiment, the first adhesive member and the second adhesive member may be formed with a material having waterproofing performance, and may have a same shape.

According to an embodiment, a thickness of the protection member may be thinner than a thickness of the recessed space, and an area of the protection member may be smaller than an area of the first adhesive member and may be larger than an area of the first opening.

According to an embodiment, the first opening and the protection member may be disposed to be aligned on a same axis.

According to an embodiment, the audio module, the waterproof film, the first adhesive member, the second adhesive member, and the protection member may be disposed perpendicularly to the axis.

According to an embodiment, the first direction may be a direction that faces the front surface of the electronic device or a direction that faces the side surface of the electronic device.

According to an embodiment, the frame structure may further form a rear surface of the electronic device, and the rear surface may be extended from the side surface.

According to an embodiment, the first direction may be a direction that faces the rear surface of the electronic device.

According to an embodiment, the audio module may include at least one of a microphone, a speaker, and a sensor using a sound.

As described above, an electronic device (for example, the electronic device 100 of FIG. 1, the electronic device 300 of FIG. 3) according to an embodiment may include: a housing forming at least part of a side surface of the electronic device, the housing including a penetrating hole exposed to an outside of the electronic device and oriented in a first direction, and a recessed portion formed adjacent to the penetrating hole: a waterproof member which covers the recessed portion while forming a recessed space in the recessed portion, the waterproof member including a sound transmission portion: and a protection member disposed in the recessed space which connects the penetrating hole and the sound transmission portion, and the sound transmission portion may be formed on an outside of a region of the waterproof member where the protection member is disposed, and the sound transmission portion may be disposed to be oriented in the first direction and to be misaligned from the penetrating hole.

According to an embodiment, the waterproof member may include: a waterproof film of a plate shape: a first adhesive member including a first opening formed therein: and a second adhesive member including a second opening formed therein, and the first opening and the second opening may form the sound transmission portion in the waterproof member.

According to an embodiment, the first adhesive member and the second adhesive member may be formed with a material having waterproofing performance and may have a same shape.

According to an embodiment, the electronic device may further include an audio module disposed in parallel with the waterproof member, and the first adhesive member may attach the waterproof film adjacent to the recessed portion while forming the recessed space, and the second adhesive member may to attach the audio module to the waterproof film.

According to an embodiment, the audio module may be disposed to output a sound in the first direction or to receive a sound in the first direction.

According to an embodiment, the penetrating hole may be exposed from a front surface of the electronic device, a side surface of the electronic device, or a rear surface of the electronic device.

According to an embodiment, a thickness of the protection member may be thinner than a thickness of the recessed space, and an area of the protection member may be smaller than an area of the waterproof member and may be larger than an area of the penetrating hole.

According to an embodiment, the penetrating hole and the protection member may be disposed to be aligned on a same axis.

According to an embodiment, a sound may enter or may be outputted from the audio module through the penetrating hole, the recessed space, and the sound transmission portion.

According to an embodiment, the protection member may be formed by using a material having higher hardness than the waterproof member, and may be formed by using at least one material of steel use stainless (SUS), a polycarbonate (PC) sheet, and urethane.

While aspects of example embodiments have been particularly shown and described, it will be understood that various changes in form and details may be made therein without departing from the spirit and scope of the following claims.

What is claimed is:

1. An electronic device comprising:
    a display which forms at least a part of a front surface of the electronic device;
    a frame structure which forms at least a part of a side surface of the electronic device, wherein the display is disposed on the frame structure, the side surface faces in a first direction, the front surface faces in a second direction perpendicular to the first direction, and the display faces in the second direction, and the frame structure comprises a first opening exposed to an outside of the electronic device through the side surface and oriented in the first direction and a recessed portion formed adjacent to the first opening;
    an audio module disposed adjacent to the recessed portion;
    a waterproof member disposed between the recessed portion and the audio module and facing the first opening in the first direction;
    a protection member disposed in a recessed space formed by the recessed portion,
    wherein the waterproof member comprises:
        a waterproof film disposed between the recessed portion and the audio module and having a first side facing in the first direction and a second side facing in a direction opposite to the first direction;
        a first adhesive member disposed on the first side of the waterproof film and configured to attach the waterproof film and the frame structure;
        a second adhesive member disposed on the second side of the waterproof film and configured to attach the audio module and the waterproof film; and
    wherein the protection member is disposed on the first adhesive member and is in a plate shape and faces the first opening in the first direction,
    wherein the first adhesive member comprises a second opening on an outside of a region of the first adhesive member where the protection member is disposed,
    wherein the second adhesive member comprises a third opening on a region of the second adhesive member, the region of the first adhesive member corresponding to the region of the second adhesive member, and
    wherein the second opening is disposed to be oriented in the first direction and the third opening is disposed to be oriented in the direction opposite to the first direction.

2. The electronic device of claim 1, wherein the audio module is configured to perform at least one of outputting a sound in the first direction and receiving a sound in the first direction.

3. The electronic device of claim 1, wherein each of the first adhesive member and the second adhesive member comprises a waterproofing material and the first adhesive member and the second adhesive member have a same shape with each other.

4. The electronic device of claim 1, wherein a thickness of the protection member is thinner than a thickness of the recessed space, and
    wherein an area of the protection member is smaller than an area of the first adhesive member and is larger than an area of the first opening.

5. The electronic device of claim 1, wherein the first opening and the protection member are aligned on a same axis.

6. The electronic device of claim 5, wherein the audio module, the waterproof film, the first adhesive member, the second adhesive member, and the protection member are disposed perpendicularly to the same axis.

7. The electronic device of claim 1, wherein the frame structure further forms a rear surface of the electronic device, and the rear surface is extended from the side surface.

8. The electronic device of claim 1, wherein the audio module comprises at least one of a microphone, a speaker, and a sensor using a sound.

9. A waterproof structure of an electronic device, the waterproof structure comprises:
   a housing comprising a front surface, a rear surface and a side surface, wherein the housing comprises a penetrating hole exposed to an outside of the electronic device through the side surface and oriented in a first direction, and a recessed portion adjacent to the penetrating hole, a display of the electronic device is exposed to an outside of the electronic device through the front surface, the side surface faces in the first direction, the front surface faces in a second direction perpendicular to the first direction, and the rear surface faces in a direction opposite to the second direction, and the display faces in the second direction;
   a waterproof member which faces the penetrating hole in the first direction, covers the recessed portion and forms a recessed space in the recessed portion, the waterproof member comprising a sound transmission portion; and
   a protection member disposed in the recessed space,
   wherein the protection member is disposed on a region of the waterproof member, is in a plate shape, and faces the penetrating hole in the first direction, the protection member being disposed between the penetration hole and the waterproof member,
   wherein the sound transmission portion is disposed on an outside of the region of the waterproof member where the protection member is disposed, and
   wherein the sound transmission portion is oriented in the first direction and misaligned from the penetrating hole.

10. The waterproof structure of claim 9, wherein the waterproof member comprises:
    a waterproof film having a plate shape and having a front side and a rear side opposite to the front side of the waterproof film;
    a first adhesive member disposed on the front side of the waterproof film and comprising a first opening therein; and
    a second adhesive member disposed on the rear side of the waterproof film and comprising a second opening therein,
    wherein the first opening and the second opening form the sound transmission portion in the waterproof member.

11. The waterproof structure of claim 10, wherein each of the first adhesive member and the second adhesive member comprises a material having waterproofing performance and the first adhesive member and the second adhesive member have a same shape with each other.

12. The waterproof structure of claim 10, further comprising an audio module disposed in parallel with the waterproof member,
    wherein the second adhesive member is configured to attach the audio module to the waterproof film.

13. The waterproof structure of claim 9, wherein a thickness of the protection member is thinner than a thickness of the recessed space,
    wherein an area of the protection member is smaller than an area of the waterproof member and is larger than an area of the penetrating hole, and
    wherein the penetrating hole and the protection member are aligned on a same axis.

* * * * *